United States Patent [19]

Levrai

[11] Patent Number: 5,226,693

[45] Date of Patent: Jul. 13, 1993

[54] HYDRAULIC ASSEMBLY FOR CONVERSION OF A PRESSURE OF A BRAKE FLUID

[75] Inventor: Roland Levrai, Stains, France

[73] Assignee: Bendix Europe Services Techniques, Drancy, France

[21] Appl. No.: 829,204

[22] Filed: Feb. 3, 1992

[30] Foreign Application Priority Data

Feb. 28, 1991 [FR] France ................... 91 02391

[51] Int. Cl.⁵ .............................. B60T 8/18
[52] U.S. Cl. ................... 303/9.69; 303/22.3; 303/22.8
[58] Field of Search .............. 303/9.69, 22.1, 22.3, 303/22.5, 22.8, 84.1

[56] References Cited

U.S. PATENT DOCUMENTS 4,682,823 7/1987 Hommen et al. ............... 303/22.4
4,858,999 8/1989 Schonlau et al. ............... 303/9.69

FOREIGN PATENT DOCUMENTS 0041020 12/1981 European Pat. Off. .
3441751 5/1986 Fed. Rep. of Germany ..... 303/9.69
3602864 8/1987 Fed. Rep. of Germany .
1574589 9/1980 United Kingdom .

Primary Examiner—Robert J. Oberleitner
Assistant Examiner—Lee W. Young
Attorney, Agent, or Firm—Larry J. Palguta; Ken C. Decker

[57] ABSTRACT

The invention relates to a hydraulic assembly for conversion of a pressure of a brake fluid at least partially controlled by the load of the vehicle and arranged between a master cylinder and at least one brake actuator. The assembly comprises a conventional braking compensator controlled by the load of the vehicle and a pressure limiter.

1 Claim, 2 Drawing Sheets

HYDRAULIC ASSEMBLY FOR CONVERSION OF A PRESSURE OF A BRAKE FLUID

The present invention relates to a hydraulic assembly for conversion of a pressure of a brake fluid arranged between a master cylinder and a brake actuator.

Such an assembly is generally provided in order to be fitted to the rear wheels of a vehicle and is intended to reduce the pressure of the brake fluid in the brake actuators of the rear wheels with respect to that existing in the brake actuators of the front wheels.

Thus, those skilled in the art seek to obtain a hydraulic assembly forming a valve respecting an input-output pressure curve as close as possible to an ideal curve in the form of a parabola, this parabola further varying with the load of the vehicle thus fitted.

Such an assembly is therefore generally constituted by a compensator controlled by the load.

The documents DE-A-3,602,863 and DE-A-3,602,864 describe for example such compensators provided with an additional means for modifying the point of intervention of the compensator and for bringing it closer to the ideal curve. However, in practice, as a result of these means, firstly a cut-off point following which the output pressure is stabilized even when the input pressure rises, and then a new rise in the output pressure proportional to the input pressure are obtained.

Thus, at mean input pressure, the output pressure becomes inadequate compared with what it could be, and this results in poor braking of the rear wheels, whereas at high input pressure, the output pressure becomes greater than it should be, and this is detrimental to safety because of the substantial risk of locking of the rear wheels at this moment.

The object of the present invention is to obviate these disadvantages and to bring the actual curve closer to the ideal curve without the adverse effects mentioned above.

According to the invention, the hydraulic assembly comprises a conventional braking compensator controlled by the load of the vehicle and a pressure limiter connected in series with the conventional compensator.

By appropriate control of the compensator and of the limiter, it is then possible to approach the ideal curve as a function of the load of the vehicle.

The invention will now be described by way of example with reference to the accompanying drawings in which.

Figure 1:
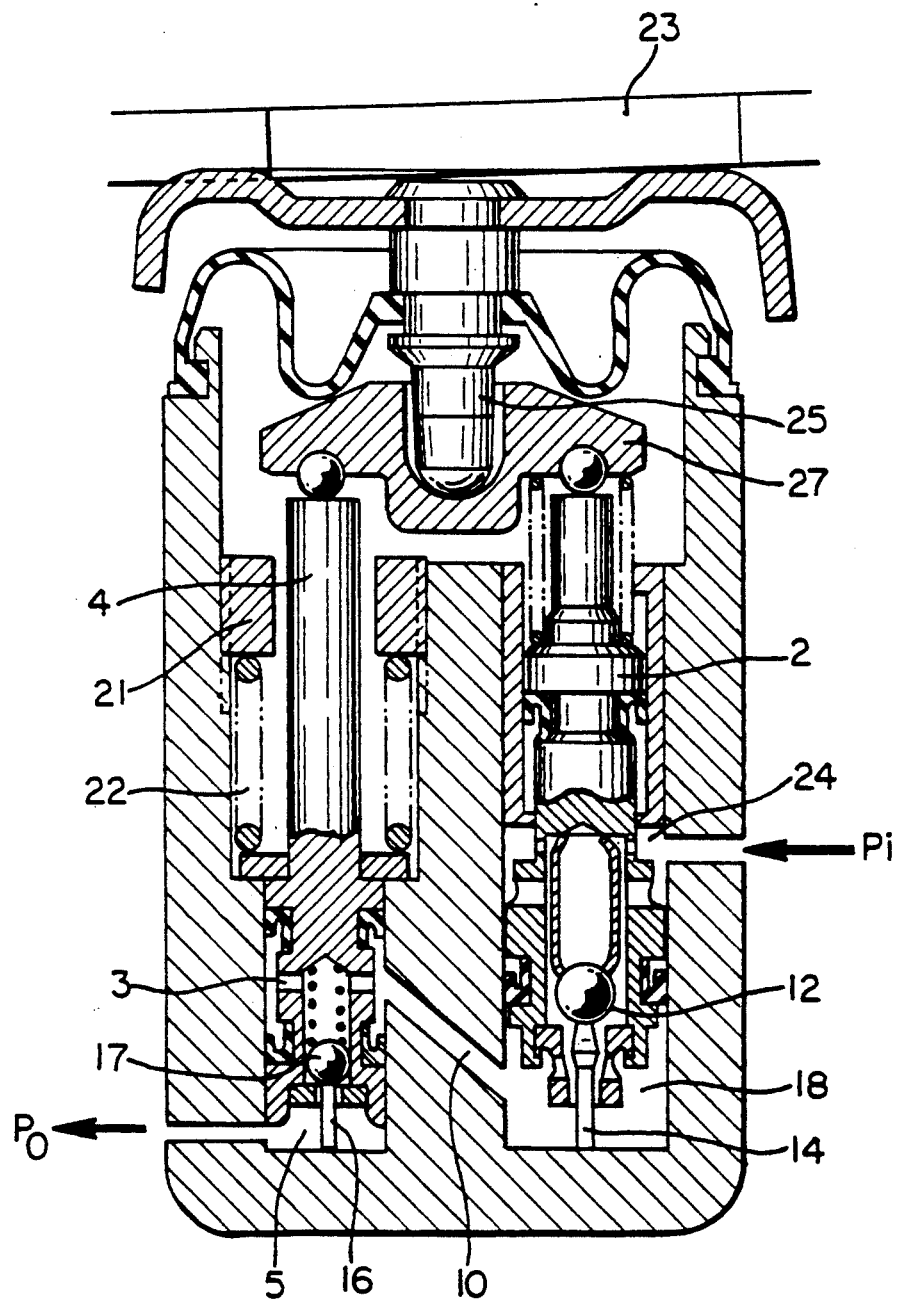
FIG. 1 shows diagrammatically and in cross-section a hydraulic assembly according to a first embodiment of the invention.

With reference now to FIG. 1, those skilled in the art will recognize the means for control by the load of the vehicle which is constituted by a lever 23 whereof one end not shown is connected to a non-suspended point of the vehicle so as to receive the load information, a rod 25 pressing onto a compensation bar 27 so as to exert a pressure on a piston 2 of a conventional compensator (right part of the figure) and on a piston 4 of a limiter (left part of the figure).

The piston 2 of the compensator carries a valve means constituted, in the example shown, by a needle 14 and a ball 12, arranged between an inlet chamber 24 where the pressure Pi coming from the master cylinder (not shown) is applied and an outlet chamber 18.

This outlet chamber 18 of the compensator is connected, via a duct 10, to the inlet chamber 3 of the limiter which is therefore arranged downstream of the compensator. The limiter comprises the piston 4 and a valve constituted by a needle 16 and a ball 17, arranged between the inlet chamber 3 and the outlet chamber 5 of the limiter. The latter chamber is connected to the associated brake actuator (not shown) which receives the pressure Po delivered by the hydraulic assembly. The limiter comprises a spring 22 which is prestressed by means of an adjustable cup 21 and which makes it possible to determine the cut-off point of the limiter above the cut-off point of the compensator.

The operation of this assembly will not be described here in detail as it is obvious to those skilled in the art. The compensator begins to act starting from its point of intervention determined by the load of the vehicle. The limiter is transparent for the assembly until the pressure in the inlet chamber 3 is higher than its cut-off point. The output pressure Po of the assembly is then stabilized even if the input pressure Pi rises.

Figure 2:
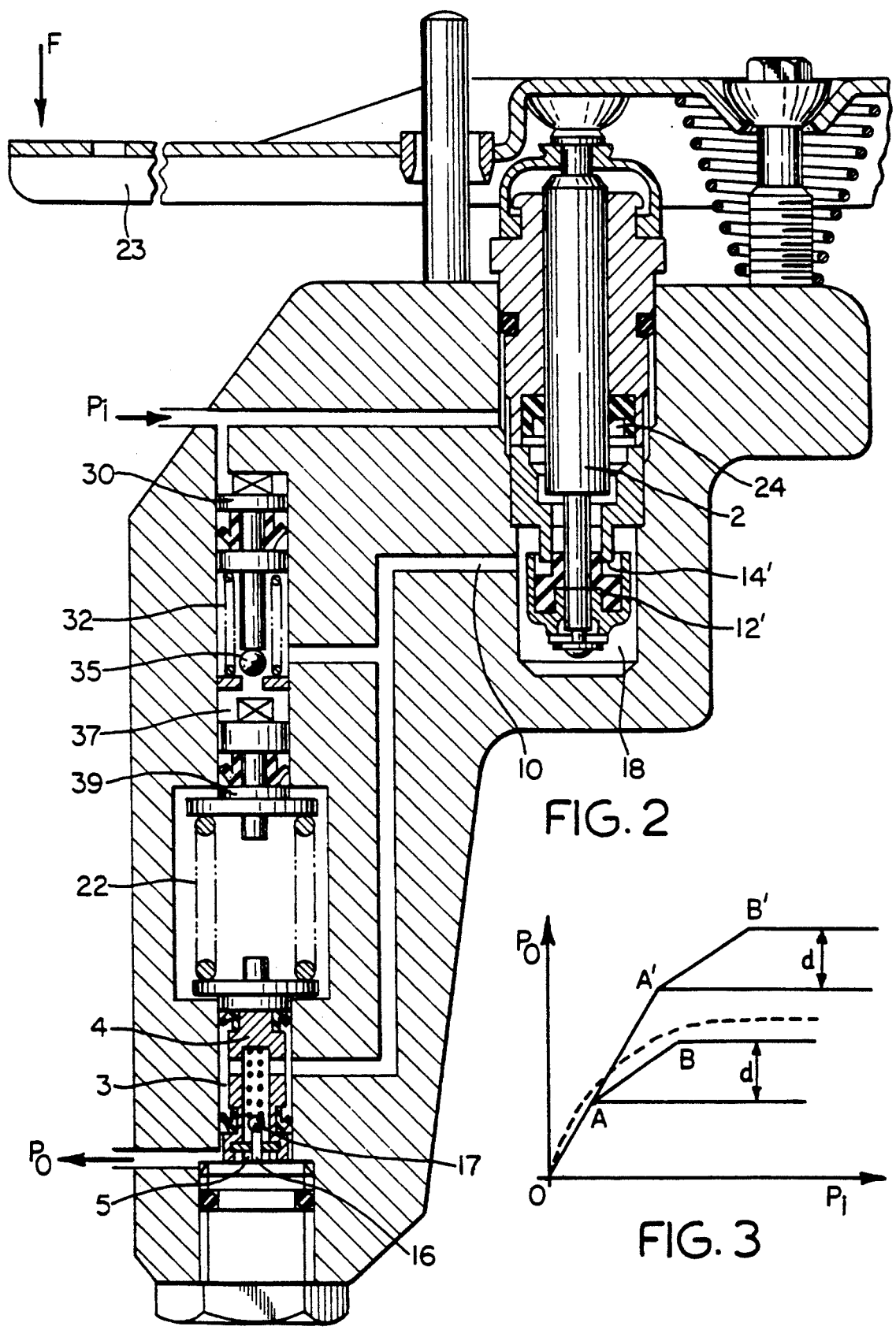
FIG. 2 shows diagrammatically a hydraulic assembly according to a second embodiment of the invention.

In the embodiment shown in FIG. 1, the vehicle load information is applied directly to the piston 4 of the limiter, which is not true of the embodiment shown in FIG. 2, according to which the difference in the output pressures between the cut-off point of the limiter and the point of intervention of the compensator is constant. The limiter is therefore controlled by the point of intervention of the compensator.

The compensator also comprises a piston 2 to which the vehicle load information is applied by the lever 23 and a valve means 12', 14' arranged between the inlet chamber 24 and the outlet chamber 18. The latter is also connected via a duct 10 to the inlet chamber 3 of the limiter in series. The latter comprises its piston 4 and the valve means 16, 17 arranged between the inlet chamber 3 and the outlet chamber 5. A prestressed spring 22 determines the cut-off point of the limiter.

The input pressure Pi delivered by the master cylinder is also applied to one of the faces of a piston 30, and the output pressure from the compensator is applied to the other face of this piston 30. A spring 32 returns the piston 30 to the rest position in its bore. The piston 30 acts on a valve member 35 capable of closing a communication between the duct 10 connected to the outlet chamber 18 of the compensator and a chamber termed a memorizing chamber 37. The prestressing of the spring 32 is such that the valve member 35 closes the above-mentioned communication at a level determined with respect to the point of intervention of the compensator. Thus, in the memorizing chamber 37 there exists a pressure dependent on this point of intervention, the latter varying in accordance with the load of the vehicle.

The pressure in this chamber 37 is applied to a piston 39 pressing onto the spring 22 of the limiter and modulates its prestressing, which has the effect of determining the cut-off point of the limiter at a pressure threshold determined with respect to the point of intervention of the compensator.

Figure 3:
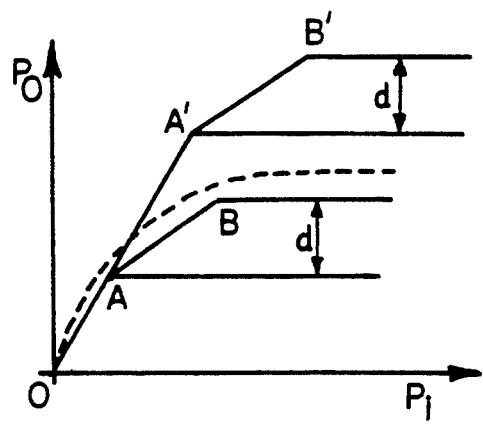
FIG. 3 shows the input-output pressure curve in two load cases of the vehicle.

FIG. 3 shows the input-output pressure curves of a hydraulic assembly as previously described for two different load states of the vehicle. The broken-line curve is the ideal curve for a given load. Starting from the point of intervention A, A' of the compensator, the slope of the curve diminishes and, starting from the cutoff point B, B' of the limiter, this slope is reduced to zero.

The output pressure Po of the assembly is therefore perfectly stabilized, at high input pressure Pi, at a threshold d determined from the point of intervention A of the input pressure Pi, the value of this threshold d being independent of the load of the vehicle.

Although preferred embodiments of the invention have been described and shown, those skilled in the art will be able to make many modifications to it without going beyond the scope defined by tee accompanying claims.

I claim:

1. A hydraulic assembly for controlling a pressure of a brake fluid as a function of a load of a vehicle, said assembly comprising:

a body with a main inlet for receiving the brake fluid at a pressure to be controlled, and with a main outlet for delivering the brake fluid at a controlled pressure, a compensator arranged in said body and comprising a first inlet connected directly to the main inlet, and a first outlet for delivering the brake fluid at an intermediate pressure as a function of a first force representative of the load of the vehicle applied to said compensator, a pressure limiter arranged in said body and comprising a second inlet connected directly to said first outlet, and a second outlet connected directly to said main outlet for delivering the brake fluid at the controlled pressure with a maximum value increasing with a second force received by said pressure limiter, a valve member located in said body, a first piston communicating with the pressure to be controlled and slidable in said body so as to close selectively said valve member when the pressure to be controlled exceeds the intermediate pressure by an amount determined in relation to a force applied on said first piston by a first spring, a chamber having a first end closed by a second piston slidable in said chamber and a second end connected selectively to said first outlet via said valve member, and a second spring having one end receiving said second force from said second piston and a second end transmitting said second force to the pressure limiter.

* * * * *